United States Patent
Huang et al.

(10) Patent No.: US 7,485,993 B2
(45) Date of Patent: Feb. 3, 2009

(54) DIRECT CURRENT BRUSHLESS VIBRATION MOTOR

(75) Inventors: Chiang-Cheng Huang, Taipei (TW); Chun-Min Chang, Miaoli County (TW); Chien-Chung Sun, Taipei (TW)

(73) Assignee: Risun Expanse Corp., Taipei (TW)

( * ) Notice: Subject to any disclaimer, the term of this patent is extended or adjusted under 35 U.S.C. 154(b) by 498 days.

(21) Appl. No.: 11/296,474

(22) Filed: Dec. 8, 2005

(65) Prior Publication Data

US 2007/0024134 A1    Feb. 1, 2007

(30) Foreign Application Priority Data

Jul. 29, 2005    (TW) ............................... 94125934 A

(51) Int. Cl.
*H02K 7/06* (2006.01)
(52) U.S. Cl. .......................................... 310/81; 310/268
(58) Field of Classification Search ................ 310/81, 310/268, 40 MM
See application file for complete search history.

(56) References Cited

U.S. PATENT DOCUMENTS

| | | | |
|---|---|---|---|
| 6,465,921 B1 * | 10/2002 | Horng et al. ............... 310/81 |
| 6,522,037 B2 | 2/2003 | Lee et al. | |
| 6,573,627 B2 | 6/2003 | Sun | |
| 6,700,275 B2 | 3/2004 | Horng et al. | |
| 6,744,163 B2 * | 6/2004 | Kajiwara et al. .............. 310/81 |
| 6,836,039 B2 | 12/2004 | Choi et al. | |
| 6,850,019 B2 | 2/2005 | Gerfast | |

* cited by examiner

Primary Examiner—Dang D Le
(74) Attorney, Agent, or Firm—Morris Manning Martin LLP; Tim Tingkang Xia, Esq.

(57) ABSTRACT

A direct current (DC) brushless vibration motor includes an inductive coil as the stator, and a magnetic element, which has a plurality of coplanar magnetic poles, as the rotor. The inductive coil is a single annular coil formed by a singly-wound conductive wire. The winding area corresponds to two magnetic poles of the magnetic element of the like polarity at opposite sides. The magnetic element has a centrifugal slot to make the gravity center of the magnetic element eccentric from the axis. When current is input into the inductive coil to form a magnetic field, the magnetic element and the magnetic field generated by the inductive coil repulse each other to generate rotation. The eccentric gravity center of the magnetic element can generate the vibration desired.

6 Claims, 5 Drawing Sheets

DIRECT CURRENT BRUSHLESS VIBRATION MOTOR

CROSS-REFERENCE TO RELATED APPLICATIONS

This non-provisional application claims priority under 35 U.S.C. § 119(a) on Patent Application No. 94125934 filed in Taiwan R.O.C. on Jul. 29, 2005, the entire contents of which are hereby incorporated by reference.

BACKGROUND OF THE INVENTION

1. Field of the Invention

The present invention relates to a direct current (DC) brushless vibration motor and particularly to a DC brushless vibration motor comprising a stator formed by a singly-wound conductive wire as a single inductive coil and a rotary magnetic element eccentric to the rotation axis thereof to generate vibration.

2. Description of the Related Art

Motors with multiple coils wound by a single wire are widely known in the art. For instance, U.S. Pat. Nos. 6,700,275 and 6,850,019 adopt multiple coils wound by a single wire. The abutting coils have opposite winding directions. After the coils are energized with electricity, opposing polarization occurs. The coil structure consists of a single wire to form multiple coils and thus multiple magnetic poles will be present when coils are energized. During winding operation, after winding of a coil is finished, the winding machine has to be stopped, and the next winding rod is turned to the winding position to start the next winding action in the opposite direction. Such a process has to be repeated many times to cause the design of winding machines more complicated, the winding time longer, and the total cost higher.

These days miniaturized vibration motors have deeply permeated into people's life with the advent of digital era and aging of population. The most notable application is in the mobile phone. When a call is coming, there are generally two types of modes to alert users, one is the ring tone mode, and the other mute vibration mode. When a handset is set to vibration mode, a vibration motor must be used to generate vibration. The miniaturized vibration motor is also used in other digital mobile devices, entertaining game players, handheld game players and the like. In the industry of producing entertaining devices, the competition is fierce. To cater to fickle tastes of consumers, providing merely video and audio effects is no longer satisfied. Some manufacturers have provided consumers with touch stimulation. For instance, the Immersion Co. of U.S.A. has a number of patents that use touch technology on computer peripherals, such as a vibration mouse, vibration keyboard, vibration joy stick on game players, and the like. The vibration of those touch mechanisms can also be generated by the vibration motor.

On the evolution of the DC vibration motor, there were a bar-typed vibration motor and a flat-typed vibration motor in earlier days (such as U.S. Pat. No. 6,522,037). They all adopted contact brushes as means of commutation. Such a structure has a shorter life span, lower reliability, easily generates sparks and results in risky conditions. To remedy the aforesaid disadvantages, the brushless vibration motor has been developed. It adopts driver integrated circuit (IC) to sense the magnetic field of rotor as means of contactless commutation (such as U.S. Pat. Nos. 6,836,039 and 6,573,627).

Refer to FIG. 1 for the operation principle of a conventional double coils DC brushless vibration motor. As the DC brushless vibration motor adopts a contactless approach to commutate the current, the vibration motor usually includes a Hall IC, such as Melexis US79, which is a Hall IC to work with double coils. Each coil of the motor has two ends, and one end of each coil connected to an O1 end and an O2 end of the IC, respectively. The other end of each coil is grounded. When the Hall IC senses a magnetic north pole of the magnet, O1 is set to a higher potential than ground and current will start to flow, from O1 through the coil at the right side, to the ground. Assumed the coil at the right side is wound in clockwise direction, as the magnetic north pole of the magnet is sensed by the Hall IC on the upper side, and the current flows from O1 to the ground. Because the coil is wound in clockwise direction, the coil generates a magnetic south pole according to Ampere's rule (right-hand rule), to repulse the magnetic south pole of the magnet. As a result, rotation is generated. Meanwhile, O2 end is open, the coil at the left side is not conductive and no magnetic field is generated. The motion is solely driven by the mutual repulsion between the magnetic field generated by the coil at the right side and the magnet. When the Hall IC senses the magnetic south pole of the magnet, O2 is set to a higher potential than ground, thus the current flows from O2 through the coil at the left side to the ground. By means of energizing the two coils alternately to generate a magnetic force repulsive to the facing magnetic poles of the magnet, a continuous rotation of the magnet can be maintained. However, such a design always has a coil on one side in an open and non-conductive condition. The rotor is driven by the electromagnetic force generated by only one energized coil, and the other un-energized coil makes no contribution to the driving force of the rotor. Moreover, the structure of the DC brushless vibration motor in aforesaid embodiment employs at least two coils, increasing the number and cost of motor parts. Fabrication difficulty and cost are also higher.

In terms of means of vibration generation, U.S. Pat. No. 6,836,039 discloses a technique that includes an annular magnet with six planar poles. A weight object is added to one side so that the rotor has a gravity center eccentric to its rotation center to generate vibration. Such a design increases the load of the rotor. More input electric energy is needed. Moreover, adding the weight object makes the profile of the motor higher, so it is difficult to miniaturize the motor. U.S. Pat. No. 6,573,627 discloses a technique that includes an annular magnet with four planar poles located eccentrically on a rotor disk. When the rotor disk rotates, the eccentric gravity center of the rotor causes vibration. However, due to space constraint, the eccentricity between the annular magnet and the rotation center is limited. As a result, the vibration intensity cannot be increased as desired. To sum up, the aforesaid DC brushless vibration motors have many drawbacks, such as complicated structures and complicated winding of the induction coils, difficult fabrication, and higher profiles, which cannot be shrunk and miniaturized as desired.

SUMMARY OF THE INVENTION

It is the main objective of the invention to provide a DC brushless vibration motor comprising a singly-wound conductive wire as a single inductive coil.

The DC brushless vibration motor according to the invention includes a circuit board, an inductive coil, a magnetic element and a controller. The inductive coil is a single annular coil formed by winding one conductive wire and located on the circuit board. The magnetic element has a plurality of coplanar magnetic poles and is located on the inductive coil. The inductive coil is wound in a range corresponding to two magnetic poles of the like polarity of the magnetic element located on the opposite sides. The magnetic element further has a centrifugal slot, which causes the gravity center of the magnetic element to be eccentric to the rotation center. When current is input to the inductive coil and a magnetic field is generated, the magnetic element and the magnetic field generated by the inductive coil repulse each other to generate rotation. As the gravity center of the magnetic element is eccentric, vibration occurs when magnetic element is rotating.

As the DC brushless vibration motor of the invention employs the inductive coil consisting of a single annular coil formed by winding one conductive wire to form the stator thereof, the winding complexity and cost decrease, the number of motor parts is reduced, and fabrication complexity and cost are lower. Moreover, the vibration intensity of the vibration motor can be enhanced without increasing the load of the magnetic element. By forming a centrifugal slot on the magnetic element, the gravity center of the magnetic element becomes eccentric. The total weight of the magnetic element does not increase, but the gravity center is further away from the rotation axis, the vibration intensity generated during rotation is greater. The invention has fewer parts, a simpler structure, and is easier to fabricate and assemble, and costs less. Since the load of the magnetic element does not increase, the size of the motor can be smaller to make miniaturization possible. This is an optimal design of the DC brushless vibration motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus is not limitative of the present invention, wherein.

DETAILED DESCRIPTION OF THE INVENTION

Figure 1:
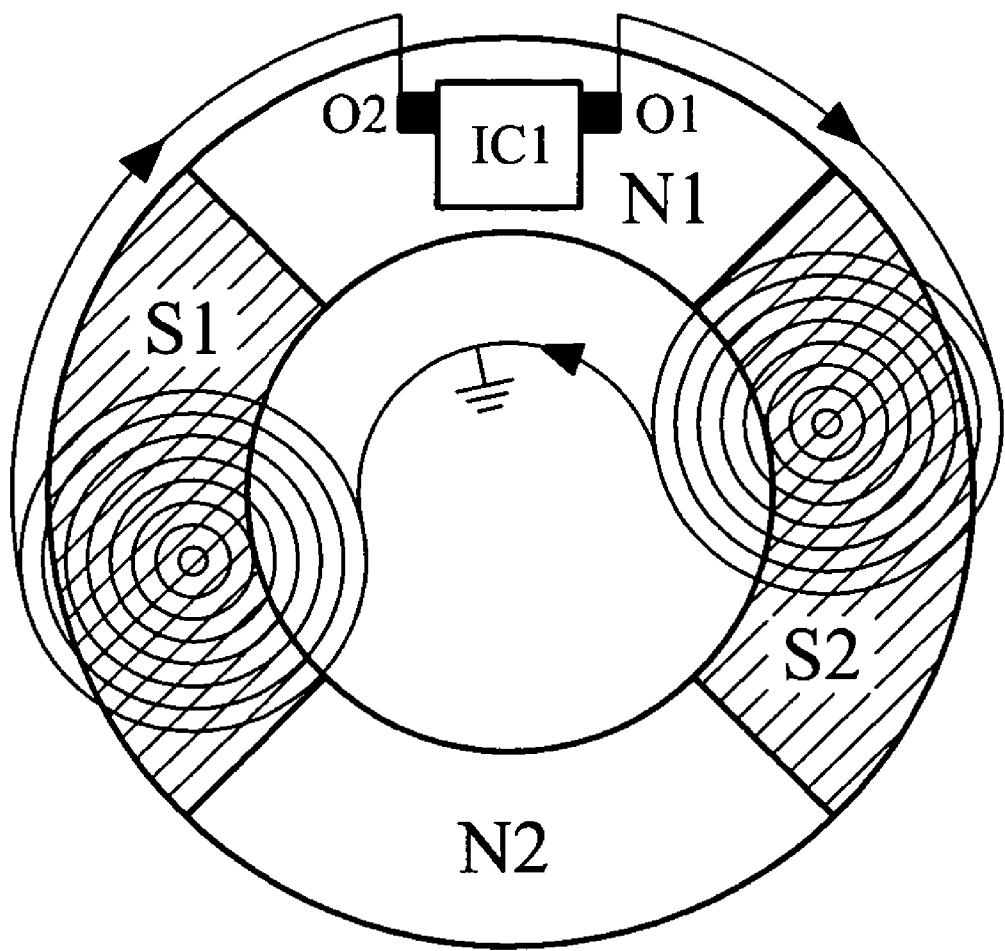
FIG. 1 is a schematic view of a conventional DC brushless motor showing the relationship of magnetic force generation.
Figure 2:
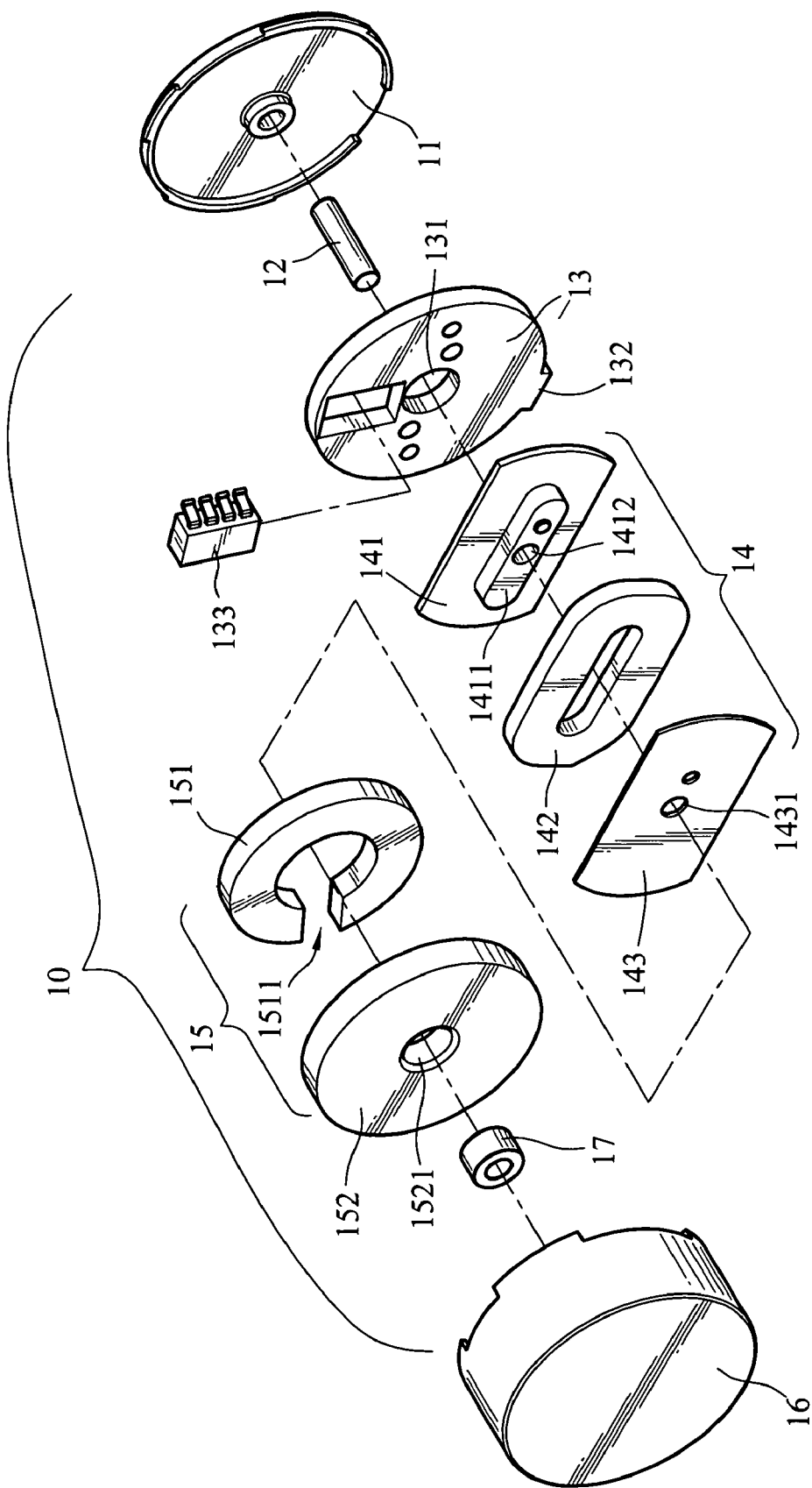
FIG. 2 is an exploded view of the first embodiment of the invention.
Figure 3:
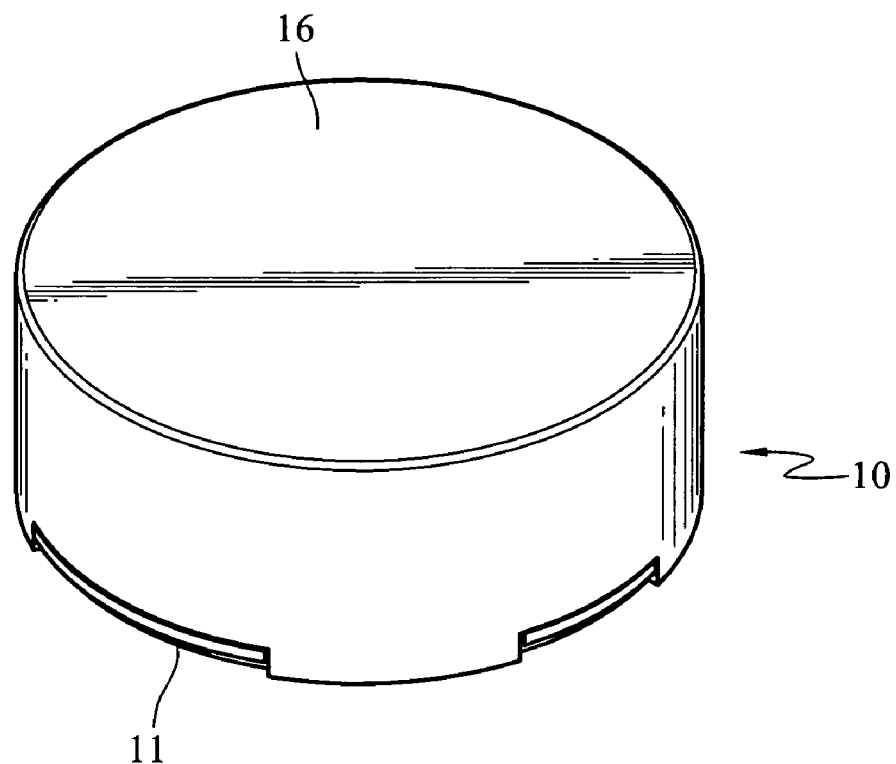
FIG. 3 is a perspective view of the first embodiment of the invention.
Figure 4:
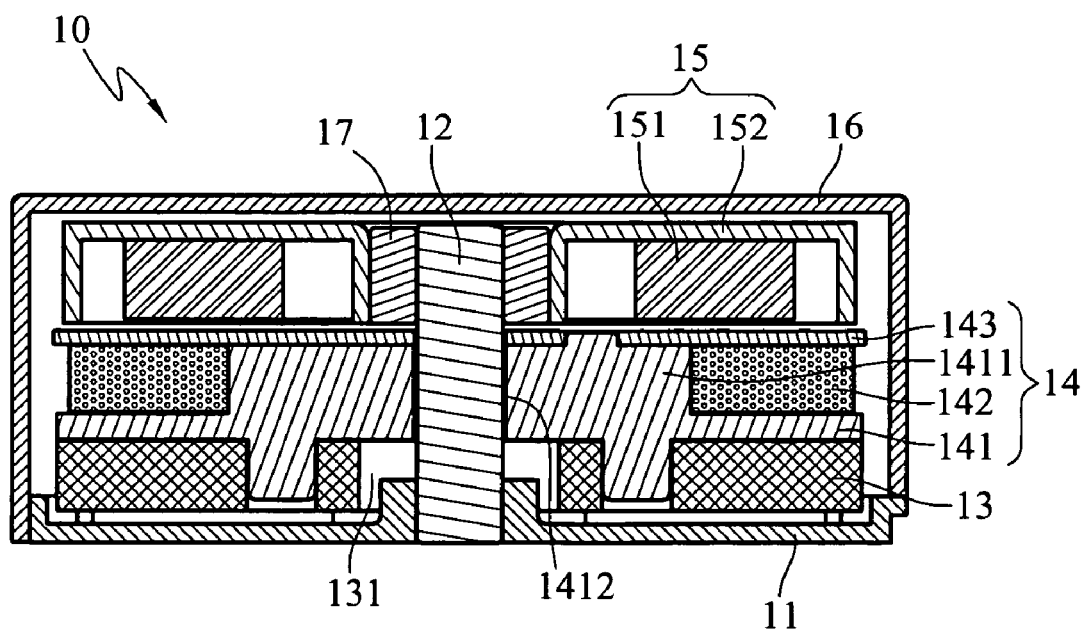
FIG. 4 is a sectional view of the first embodiment of the invention.

Refer to FIGS. 2, 3 and 4 for the first embodiment of the DC brushless vibration motor 10 of the invention. It includes a base 11, a axle 12, a circuit board 13, a winding assembly 14, a rotary element 15 and a housing 16. The base 11 is a circular disk. The housing 16 is a hollow barrel to be coupled with the base 11. The inner hollow space of the housing 16 is to house the axle 12, circuit board 13, winding assembly 14, and rotary element 15.

The axle 12 is fixed on the center of the base 11 and extrudes upward to serve as the rotation axis of the DC brushless vibration motor 10. The circuit board 13 is circular and mounted onto the base 11, and has an opening 131 in the center to allow the axle 12 pass through. The circuit board 13 has a power input port 132 to be electrically connected to an external power supply (not shown in the FIGS). The circuit board 13 further has a controller 133, which could be an Integrated Circuit (IC), responding magnetically to commutate the current.

The winding assembly 14 includes a bottom plate 141, an inductive coil 142 and a lid 143. The bottom plate 141 has a winding strut 1411 vertically located in the center. The winding strut 1411 has an aperture 1412. The circuit board 13 is coupled with the bottom plate 141, and both are mounted onto the base 11. The winding strut 1411 is wound around by one wire to form the inductive coil 142, which is annular and consists of a single coil. The shape of the inductive coil 142 is roughly elliptic or rectangular with a longer axis spanning across the diameter of the circuit board 13. The lid 143 has a hole 1431 to allow the axle 12 pass through and is coupled with the winding strut 1411 to cover the inductive coil 142.

The rotary element 15 includes a magnetic element 151 and a cap 152. The magnetic element 151 is an annular and co-planar permanent magnet with a plurality of magnetic poles S1, N1, S2 and N2 (referring to FIG. 5). The magnetic flux line is mainly in the axial direction. The magnetic element 151 has a centrifugal slot 1511 on one side so that the magnetic element 151 is formed in a C-shape. As a result, the gravity center of the magnetic element 151 is eccentric to the circular center of the magnetic element 151. The cap 152 is made of a material with high permeability and has an axle hole 1521 in the center to hold a bearing 17. Both the cap 152 and the magnetic element 151 are pivotally coupled with the axle 12 via the bearing 17, and located above the winding assembly 14. The notch formed by the centrifugal slot 1511 of the magnetic element 151 is encased by the cap 152 of high permeability; hence most of the magnetic flux line of the magnetic element 151 can be confined within the cap 152.

Figure 5:
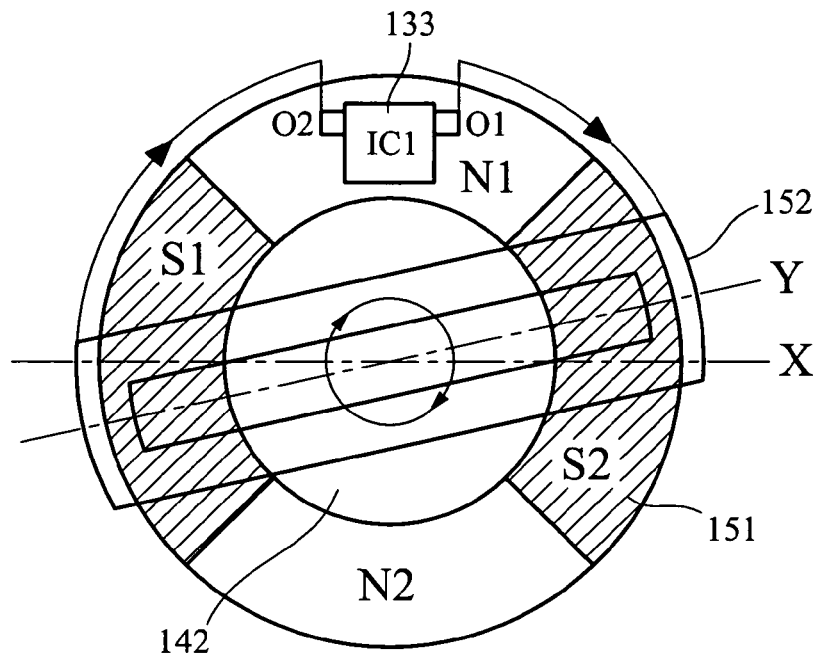
FIG. 5 is a schematic view of the first embodiment of the invention showing the relationship of magnetic force generation.

Referring to FIG. 5, the magnetic element 151 with four coplanar magnetic poles S1, N1, S2 and N2 is a permanent magnet and serves as the rotor of the DC brushless vibration motor 10. In other words, the magnetic element 151 is rotateably disposed around the axle 12. The inductive coil 142 formed by winding one conductive wire in a single coil has a winding area approximate to the area enclosed by two opposing magnetic poles S1 and S2 of the like polarity on the magnetic element 151. That means the plurality of the coplanar magnetic poles of the magnetic element 142 with like polarity corresponds to the formed magnetic poles of the inductive coil 142. The inductive coil 142 has two ends connecting to O1 end and O2 end of the controller 133. When the controller 133 senses (or called as "is induced by") the north poles of magnetic element 151, O1 is set to be at a high potential and O2 a low potential. Thus current starts to flow from O1 to O2. On the other hand, when the controller 133 senses the south poles of the magnetic element 151, O2 is set to be at the high potential and O1 the low potential. Thus, current flows from O2 to O1. If the winding direction of the inductive coil 142 is clockwise, when the controller 133 senses the north poles (N1, N2) of the magnetic element 151, as the inductive coil 142 faces the south poles (S1, S2) of the magnet, the inductive coil 142 must have a current in clockwise direction to produce magnetic south poles facing those of the magnet. Repulsion occurs between the magnetic element 151 and the magnet. Meanwhile, the magnetic north poles N1 and N2 of the magnetic element 151 are attracted by the magnetic south pole produced by the inductive coil 142. As the long axis Y of the inductive coil 142 forms an angle with the central axis X formed by connecting the central lines of magnetic south poles S1 and S2, the distance between the S poles of the inductive coil 142 and the N2 pole of the magnetic element 151 is shorter than that of the N1 pole of the magnetic element 151, hence the attractive magnetic force between the S poles of the inductive coil 142 and the N2 pole of the magnetic element 151 is stronger than that of the N1 pole. As a result, the N2 pole of the magnetic element 151 is moved towards the inductive coil 142. Hence the magnetic element 151 rotates clockwise. When the controller 133 senses the south poles (S1, S2) of the magnetic element 151, the inductive coil 142 must have a current in clockwise direction, to produce magnetic north poles, to drive the magnetic element 151 to rotate. By repeating the process previously discussed, the continuous rotation of the magnetic element 151 can be achieved and maintained.

Compared with the operation of the conventional double coils DC brushless motor, the inductive coil 142 of the invention covers just two corresponding and opposing magnetic poles S1 and S2 of the like polarity on the magnetic element 151. The entire inductive coil 142 is energized and generates a magnetic field all the time while the DC brushless vibration motor is in operation. Only the polarized directions are opposite to each other. Hence the entire magnetic coil 142 can generate a magnetic torque through the magnetic flux, and repulsion is produced against two magnetic poles of the like polarity on the magnetic element 151, thus the driving force is greater than that generated by the repulsion between only one coil and one magnetic pole on the magnetic element 151 of the double coil vibration motor. Moreover, the operation current of the DC brushless vibration motor is related to the resistance of the inductive coil 142. The smaller the resistance, the larger the operation current becomes. In the conventional double coil motor, only one coil is conductive during operation. Due to motor space constraint, there is no much space can be allocated for winding one coil to achieve adequate resistance, hence the motor operation current is often too large. In the invention, the entire coil of the inductive coil 142 is utilized, and the winding space is larger than the combination of the two coils previously discussed. Hence a desired winding length can be achieved and a desired resistance can be obtained to reduce the operation current.

Figure 6:
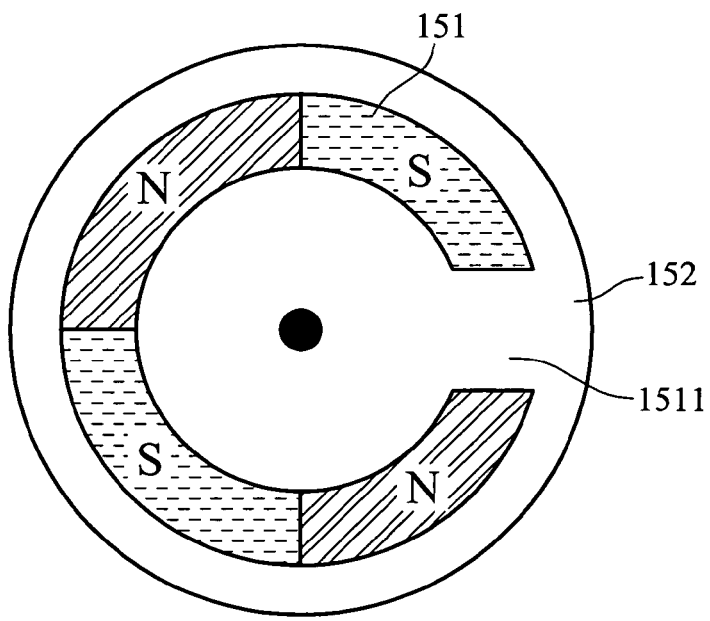
FIG. 6 is a schematic view of the first embodiment of the invention showing the relationship of rotary elements.
Figure 7:
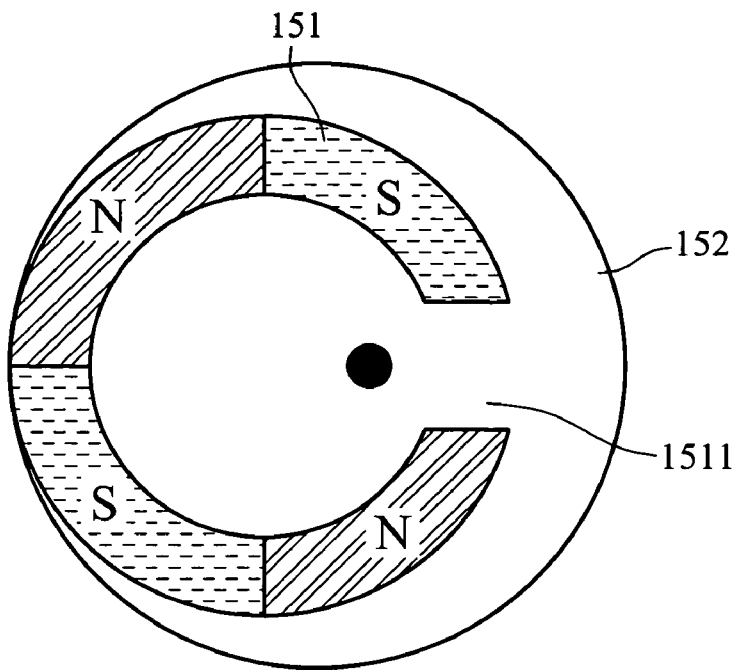
FIG. 7 is a schematic view of the second embodiment of the invention showing the relationship of rotary elements.

Referring to FIG. 6, in the DC brushless vibration motor 10 the centrifugal slot 1511 of the magnetic element 151 is formed, so that the magnetic element 151 looks like a C-shape, and it is encased by a cap 152 made of a material with high permeability. Hence most of the magnetic flux line of the magnetic element 151 on the slot can be restrained within the cap 152 and maintained intact. With the existence of centrifugal slot 1511, the gravity center of the magnetic element 151 is moved away from the rotation center based on the axle 12. Thus when the magnetic element 151 rotates, vibration occurs due to the eccentricity. Refer to FIG. 7 for the second embodiment of the invention. The outer diameter of the magnetic element 151 is smaller than the inner diameter of the cap 152. Hence the magnetic element 151 is moved eccentrically in the opposite direction of the centrifugal slot 1511. As a result, the gravity center of the entire rotor assembly, consisting of the magnetic element 151 and the cap 152, is further away from the rotation center. And a greater vibration intensity can be generated when the rotor assembly rotates.

Figure 8:
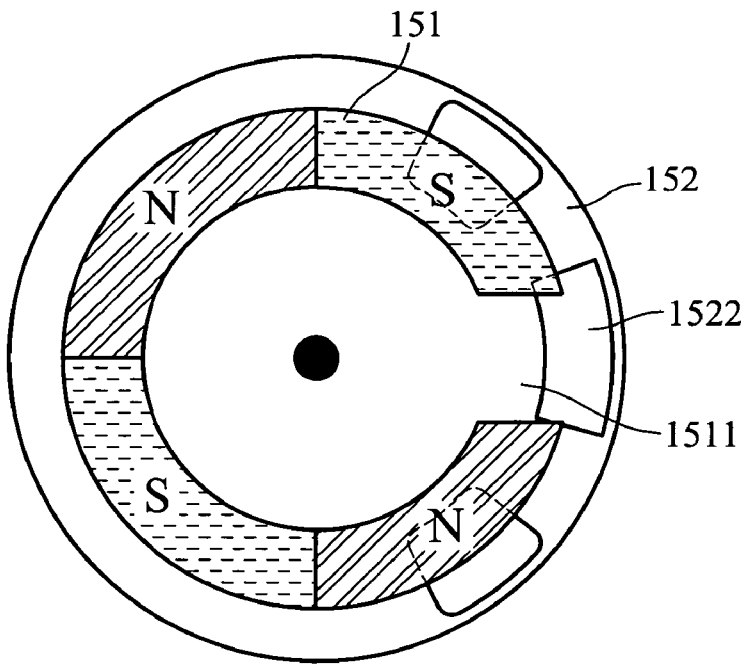
FIG. 8 is a schematic view of the third embodiment of the invention showing the relationship of rotary elements.

Refer to FIG. 8 for the third embodiment of the invention. The cap 152 has a plurality of carved out openings 1522 corresponding to where the centrifugal slot 1511 is located, but not exactly on the same location. Hence most of the magnetic flux line of the magnetic element 151 can still be restrained within the cap 152 and maintained intact. With the carved out openings 1522, the gravity center of the rotary element 15 is moved away more eccentrically to the rotation center based upon axle 12 to further enhance the vibration intensity.

Knowing the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A direct current (DC) brushless vibration motor, comprising:
    a circuit board which has a power input port and an axle;
    an inductive coil wound axially by a single conductive wire on the circuit board to receive current to form magnetic poles;
    a magnetic element rotateably disposed around the axle and corresponding to the inductive coil, the magnetic element having a plurality of coplanar magnetic poles that are arranged sequentially according to like and unlike polarities, the plurality of the coplanar magnetic poles with like polarity corresponding to the formed magnetic poles of the inductive coil, and the magnetic element having at least one centrifugal slot to alter the gravity center of the magnetic element; and
    a controller located on the circuit board approximate to one of the coplanar magnetic poles and electrically connected to the inductive coil;
    wherein the controller is induced by the approximate pole of the magnetic element to control the current flowing through the inductive coil to form the magnetic poles having polarity unlike to the polarity of the corresponding magnetic poles of the magnetic element to form a magnetic polarity repulsive to the magnetic element thereby the magnetic element generates a rotation kinetic energy about the axle and produces vibration.

2. The DC brushless vibration motor of claim 1 further comprising a cap which encases the magnetic element to cover the centrifugal slot to maintain most of magnetic flux lines of the magnetic element intact.

3. The DC brushless vibration motor of claim 2, wherein the cap has a plurality of carved out openings on the same side of the centrifugal slot spaced from the gravity center thereof.

4. The DC brushless vibration motor of claim 2, wherein the cap is larger than the magnetic element so that the magnetic element is eccentric from the axle along the cap to increase vibration intensity.

5. The DC brushless vibration motor of claim 1, wherein the centrifugal slot is located on an edge of one side of the magnetic element such that the magnetic element is formed in a C-shape.

6. The DC brushless vibration motor of claim 1, wherein the centrifugal slot is located proximate to an edge of the magnetic element.

* * * * *